United States Patent
McKinney et al.

[11] Patent Number: 5,946,919
[45] Date of Patent: Sep. 7, 1999

[54] FOOD CONSERVATOR SYSTEM

[75] Inventors: Edward C. McKinney, San Rafael; Charles E. Taylor, Sebastopol; Richard J. Thalheimer, San Francisco, all of Calif.

[73] Assignee: Sharper Image Corp., San Francisco, Calif.

[21] Appl. No.: 09/071,274

[22] Filed: May 1, 1998

Related U.S. Application Data

[60] Provisional application No. 60/045,429, May 2, 1997.

[51] Int. Cl.⁶ .................................................. F25B 21/02
[52] U.S. Cl. ................................ 62/3.7; 62/78; 62/176.1; 62/270; 62/169
[58] Field of Search ............................. 62/3.6, 78, 176.1, 62/270, 169, 100; 99/472, 467, 474, 476

[56] References Cited

U.S. PATENT DOCUMENTS

| | | | |
|---|---|---|---|
| 3,300,990 | 1/1967 | Jarmus | 62/3 |
| 3,339,475 | 9/1967 | Martin | 99/271 |
| 4,426,923 | 1/1984 | Ohata | 99/468 |
| 4,579,051 | 4/1986 | Berrens | 99/468 |
| 4,845,958 | 7/1989 | Senda et al. | 62/418 |
| 4,961,322 | 10/1990 | Oguma et al. | 62/179 |
| 5,142,970 | 9/1992 | ErkenBrack | 99/472 |
| 5,195,427 | 3/1993 | Germano | 99/472 |
| 5,271,240 | 12/1993 | Detrick et al. | 62/268 |
| 5,347,918 | 9/1994 | Chen | 99/472 |
| 5,456,164 | 10/1995 | Bang | 99/468 |
| 5,522,216 | 6/1996 | Park et al. | 62/3.6 |
| 5,570,628 | 11/1996 | Kiener et al. | 99/472 |

*Primary Examiner*—Henry Bennett
*Assistant Examiner*—Mark Shulman
*Attorney, Agent, or Firm*—Flehr Hohbach Test Albritton & Herbert LLP

[57] ABSTRACT

A preferably self-contained food conservator system includes a vacuum compartment appropriate for storing baked goods, in which a negative pressure of about 10" Hg in maintained, preferably at about 60% relative humidity. The environment of the compartment preferably is feedback-controlled by a microprocessor control. The microprocessor preferably can control vacuum, relative humidity, temperature, the amount of ozone introduced into the compartment to retard bacterial growth, as well as outgassing time cycles. A pushbutton type menu allows a user to input data used to control the microprocessor, and permit optimization of the compartment environment for the particular foodstuffs presently being stored.

20 Claims, 6 Drawing Sheets

FOOD CONSERVATOR SYSTEM

RELATIONSHIP TO PREVIOUSLY FILED APPLICATION

This application claims priority from pending U.S. provisional patent application Ser. No. 60/045,429 filed on May 2, 1997 by applicants herein for a "Food Conservator System".

FIELD OF THE INVENTION

The invention relates generally to preserving foodstuffs, and more particularly to a system for extending useable life of breads, pastries, and other foodstuffs having relatively small moisture content.

BACKGROUND OF THE INVENTION

Foodstuffs such as breads, pastries, and the like are commonly preserved within the home, often in a refrigerator. While such foodstuffs can be preserved in the home without refrigeration, useful lifetime of the foodstuff is extended with refrigeration. Unfortunately, refrigerators are typically large and relatively expensive, and have a limited volume for storage. Understandably, if the refrigerator is used to maintain breads and the like, there will be less refrigerator storage for meats, vegetables, beverages, etc.

What is needed, is a more compact, less expensive apparatus for preserving breads, pastries, and the like. Preferably such apparatus should be scalable, for example, to fit on a kitchen countertop.

The present invention provides such a system.

SUMMARY OF THE INVENTION

The present invention provides a food conservator system comprising preferably a sealable compartments within which a negative pressure (e.g., a vacuum) of about 10" Hg is maintained, preferably at least 60% relative humidity. Such a compartment is especially suited for storing baked goods, including breads and pastries.

The system is preferably self-contained in that electrical pump or pumps for creating negative pressure are disposed within the system. In one embodiment, a keyboard-type control and menu lets a user set the internal conditions for the compartment. To minimize odor and retard bacterial growth within the compartment, the present invention preferably provides ozone and activated charcoal. Preferably integrated circuit electronics controls release of ozone, as needed. The system may be battery operated and is thus suitable for use in recreational vehicles, boats, and the like.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
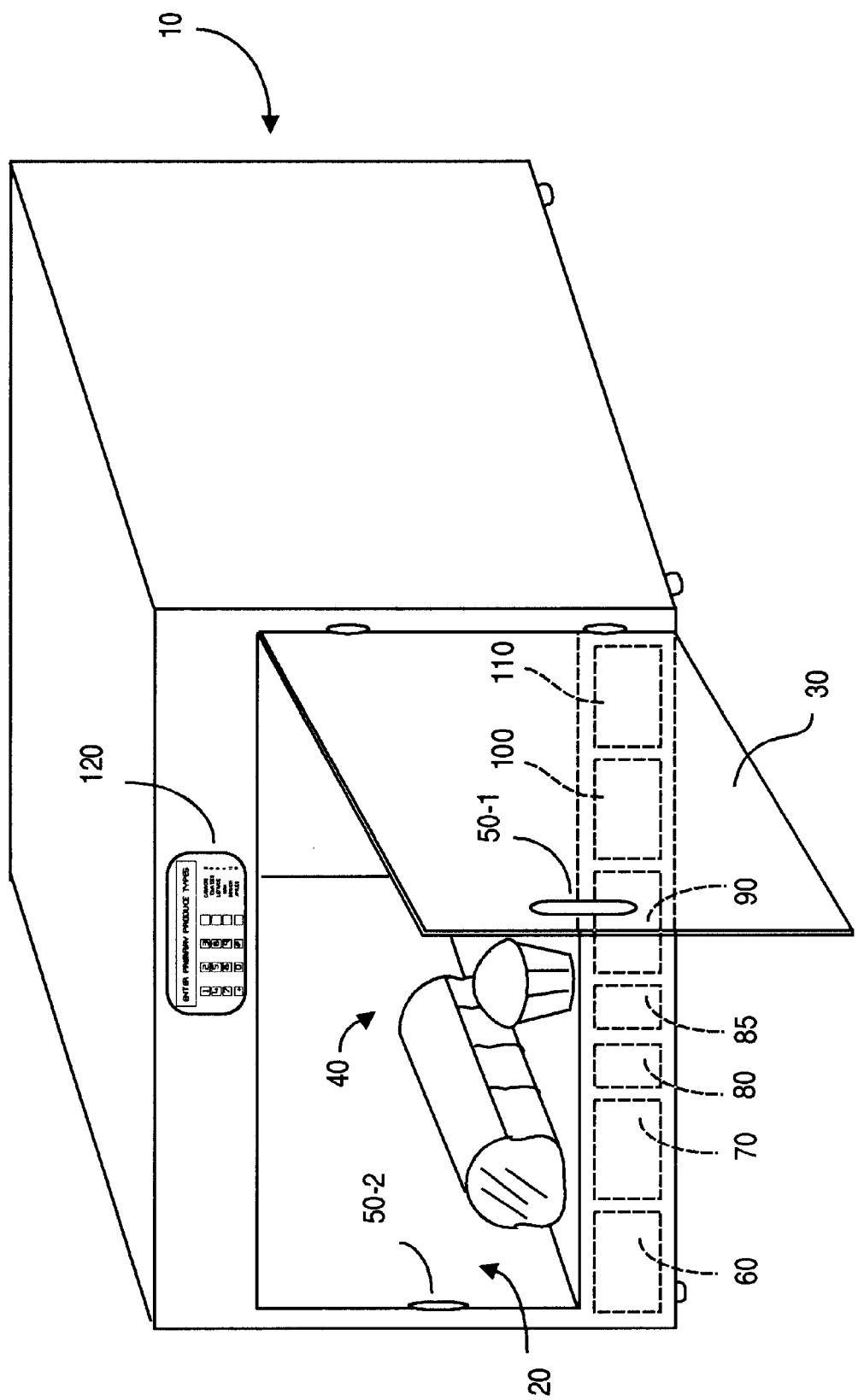
FIG. 1 is a perspective view of a front loading embodiment of the present invention.

FIG. 1 depicts a front-loading embodiment of a food conservator according to the present invention. A housing 10 encloses a sealable compartment 20, access to which is provided by a front opening door 30. Stored in compartment 20 are foodstuffs 40, preferably baked and other goods whose shelf life can be extended by a vacuum environment. The desired vacuum environment is preserved by a sealable latch mechanism 50-1, 50-2 that permits opening and closing door 30 to gain access to compartment 20. To provide visibility without having to first access the compartment, all or a portion of door 30 may be made transparent, e.g., using glass, plastic, or the like. The volume of compartment 20 may be small for mobile food conservators, e.g., perhaps 0.2 $ft^3$ or so, or may be substantially larger, especially in commercial applications.

Within compartment 20, a negative pressure (or vacuum) environment of about 10" Hg and at least 60% relative humidity is maintained. This environment is created by a vacuum pump (or equivalent) 60, located within food conservator housing 10. The present invention provides a vacuum pump 60 that creates a desired vacuum environment within chamber 20, preferably about 10" Hg. A variety of vacuum pump type units may be used for unit 60, including roller-within-a-tube pumps.

Optionally, chamber 20 is made coolable, and a cooling unit 70 preferably is also provided. Although many cooling devices and methods are known, a Peltier-type cooling unit can be especially economical and efficient.

Chamber 20 may eventually take on an odor from the foodstuffs within, and thus the present invention preferably includes an ozone ($O_3$) and/or ultraviolet (UV) generator 80, and/or a humidifier unit 85, and/or an activated charcoal chamber 90. By generating ozone and/or ultraviolet radiation, unit 80 helps retard and/or kill mold spores and other undesired components that may be present within chamber 20. Such mold spores and the like can render foodstuff 40 stored within compartment 20 inedible, or at least undesirable. Ozone also contributes to combating odors that may develop within a compartment. The inclusion of an activated charcoal chamber 90 helps further combat odors and removes $CO_2$ byproducts from chamber 20.

Energizing power for the present invention is provided by a power source 100, which may be a conventional 110/220 VAC house current, or AC:DC power unit, and/or a battery. If desired, an externally disposed power source could be used, for example, a vehicle battery. Powering the present invention from a battery source 100 allows mobility, e.g., taking and using the invention on a camping trip, or on a lengthy road trip. Preferably various ones of, or all, units 60, 70, 80, 85, 90, and optionally 100 are controlled by an integrated circuit microprocessor unit (CPU) 110 that includes internal memory that stores at least an algorithm for controlling the environment within chamber 20. As described later herein, a user can command operation of the present invention, especially environmental conditions within chamber 20, via a controller unit 120 (see FIG. 3).

Figure 2:
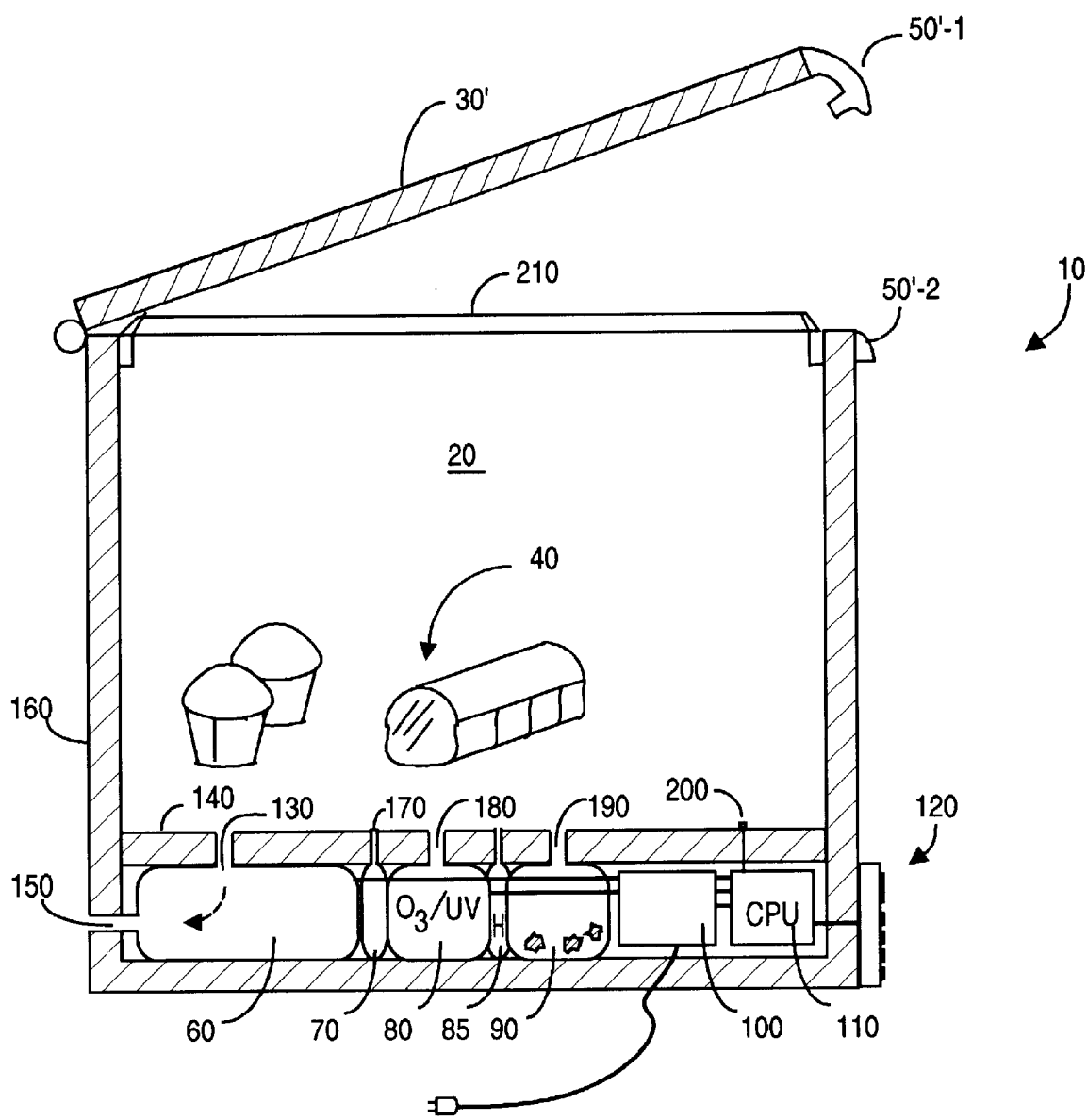
FIG. 2 is a cross-section of a top loading embodiment of the present invention.

Of course housing 10 may be accessible other than through a front or side door. For example, the cross-sectional view of FIG. 2, for example, presents a top loading embodiment of the present invention. In FIG. 2, a top loading compartment 20 is shown, in which a top lid 30' is hingedly attached to housing 10, and is provided with a sealable latch mechanism 50'-1 and 50'-2. In FIG. 2, vacuum pump 60 draws air from chamber 20 via one or more input ports 130, for example in a floor or shelf member 140 of housing 10, and exhausts the air via one or more output ports 150, e.g., in a sidewall 160 of housing 10. Of course a vacuum mechanism 60 could be mounted other than beneath a floor chamber of housing 10, and the location and configuration of input and output ports could be differently disposed.

In FIG. 2, cooling unit 70 preferably provides cooling to port(s) or other region 170, exposed to chamber 20. Ozone generator and/or ultraviolet unit 80 may also be mounted beneath member 140 and delivers $O_3$ and/or UV via one or more output ports 180. Humidifier unit 85 may be similarly mounted, and will include a user-refillable reservoir of liquid (e.g., water) that may be controllably released into chamber 20 via one or more outlet ports to vary internal humidity therein. Similarly, activated charcoal unit 190 may also be so disposed, and communicates with chamber 20 via one or more ports 190. Although discrete ports are shown for the various units in FIG. 2, in practice one or more ports may be used to more than one of the units. For example, chamber 20 communication with ozone unit 80 and activated charcoal unit 90 (assuming both are present) may be via common port(s). Of course, other combinations of output ports and unit outputs are also permissible.

A sensor unit 200 is disposed to experience the environment within chamber 20, and to couple appropriate signals to microprocessor unit 110. For example, sensor 200 might sense pressure, and/or relative humidity, and/or temperature, and/or relative amount of bacteria within chamber 20. Using signals output by sensor 200, microprocessor 200 could command vacuum unit 60 to increase or decrease chamber 20 pressure, relative humidity, temperature, and so forth. In FIG. 2, a perimeter seal 210 helps ensure that when lid 30' is closed, a tight seal is maintained such that the environment within chamber 20 is substantially maintained. As such, seal 210 should minimize loss of vacuum, loss of internal humidity, temperature and so forth. Preferably seal 210 is flexible, and may be fabricated from rubber or the like.

Note in FIG. 2 that foodstuffs 40 in chamber 20 preferably are elevated from the bottom of the compartment by placement on shelf member 140. This configuration protects the foodstuffs from moisture that might collect on the bottommost floor of the housing.

Figure 3:
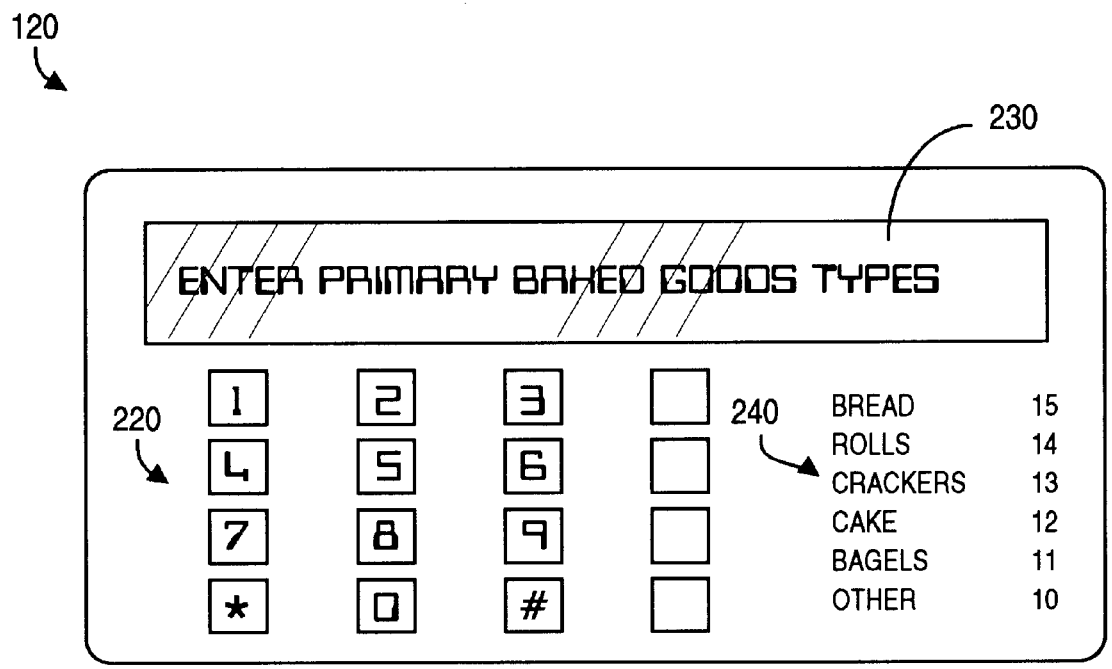
FIG. 3 depicts an exemplary keypad control/display unit for controlling the environment within the present invention.

FIG. 3 exemplifies a typical controller unit 120 that a user may use to control the internal environment of compartment 20. As noted a microprocessor-type integrated circuit (IC) 110 is coupled to one or more sensors 200 to monitor the environment within compartment 20. Controller unit 120 can permit a user to customize the internal environment of compartment 20, as a function of the particular foodstuffs presently within the unit. Preferably unit 120 includes one or more buttons or similar controls 220 that a user can push or touch or perhaps remotely control to input certain information to microprocessor unit 110. Preferably unit 120 further includes a display 230, such as a liquid crystal display (LCD), that can be used to prompt the user for input data, and to visually confirm to the user that the desired user input has indeed been input correctly. In the embodiment of FIG. 3, indicia 240 may be placed on the surface of controller unit 120 as a guide to the user.

By way of example, suppose that at present compartment 20 stores perhaps twenty dinner rolls that will be held for a week or two. Unit 120 would permit the user to input the type and quantity of foodstuffs, which data would permit unit 110 to control the environment of compartment 20 in an appropriate fashion. In this example, the user would press the "1", the "4", and then the "enter" key 220. The memory associated with CPU unit 110 stores an algorithm, executed by the CPU, that will next prompt the user on display 230 (and/or with an audible prompt signal) to now input quantity, e.g., "2" and "0" followed by "enter". The algorithm would determine from CPU unit 110 and sensor 200 what the present conditions within chamber 20 are, and what changes (if any) are desired to make such conditions more favorable for storing twenty dinner rolls. If humidity should be increased, CPU unit 110 will cause humidity unit 85 to output more moisture into compartment 20. If less vacuum should be used, CPU unit 110 will command vacuum pump 60 to decrease internal pressure. Other user-input data could include anticipated length of storage of the foodstuff, e.g., 48 hours, two weeks, two months, etc.

In addition to inputting data concerning present contents of compartment 20, the user may also command certain operations that CPU unit 110 normally attends to. For example, CPU unit 110 may periodically cause the release of additional UV and/or $O_3$ into compartment 20. However if upon opening the compartment the user smells an odor, the user can use controller unit 120 to cause release of additional UV, $O_3$, etc. at this time. Preferably the stored algorithm is adaptive and will "learn" from various such user inputs, such that outgassing will occur more frequently, or more UV and/or more $O_3$ will be generated, etc.

Figure 4A:
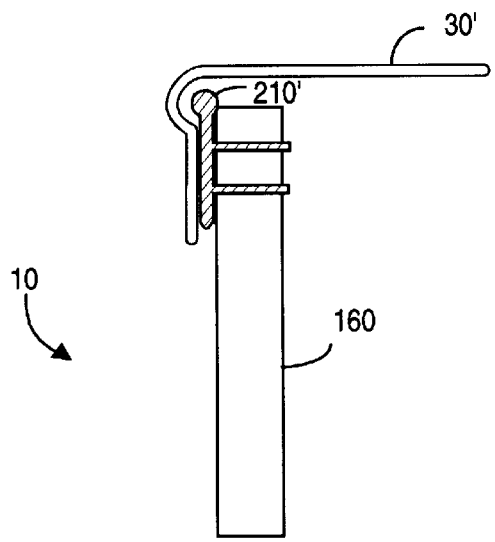
FIGS. 4A, 4B, and 4C depict sealing mechanisms suitable for use with the present invention.
Figure 4B:
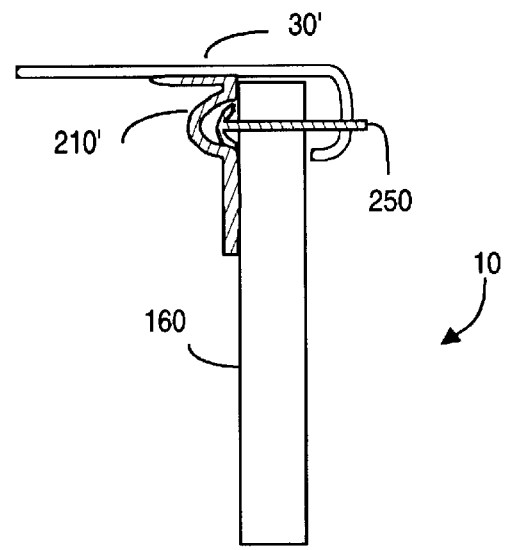
Figure 4C:
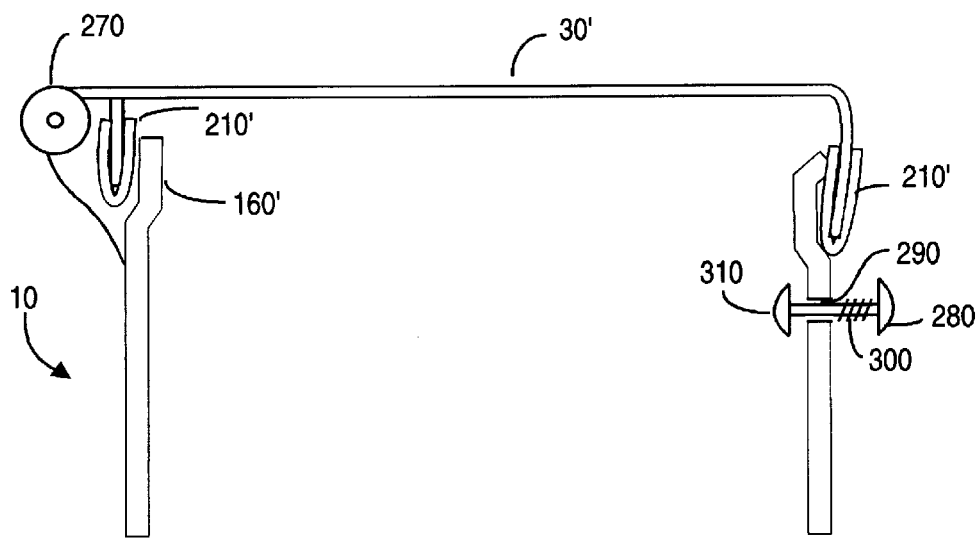

FIGS. 4A, 4B, and 4C depict details of various forms of sealing shut compartment 20 to maintain the desired internal vacuum. In FIG. 4A, a flexible seal portion 210' permits lid 30' (in a top opening configuration) to hinge open and then be sealingly shut. In FIG. 4B, an alternate shape of a flexible seal portion 210' is depicted, in conjunction with a release member 250. In FIG. 4C, a hinge mechanism 270 is shown on an edge of lid 30', and flexible seal portions 210' are somewhat "U-shaped".

Note in FIG. 4C the inclusion of a pressure relief button 280 that may in fact be incorporated into the latch mechanism that opens lid 30' to provide access to compartment 20. Pushing button 280 into opening 290 will allow ambient air to enter chamber 20, thus increasing internal pressure. As a result, the internal vacuum is decreased, which makes it easier to open lid 30'. Normally a spring 300 on the shaft of button 280 forces the button outward, which presses an internal seal member 310 tightly against opening 290, thus sealing the opening. The sealing mechanisms shown in FIGS. 4A–4C are intended to be exemplary, and other configurations may instead be used.

Figure 5:
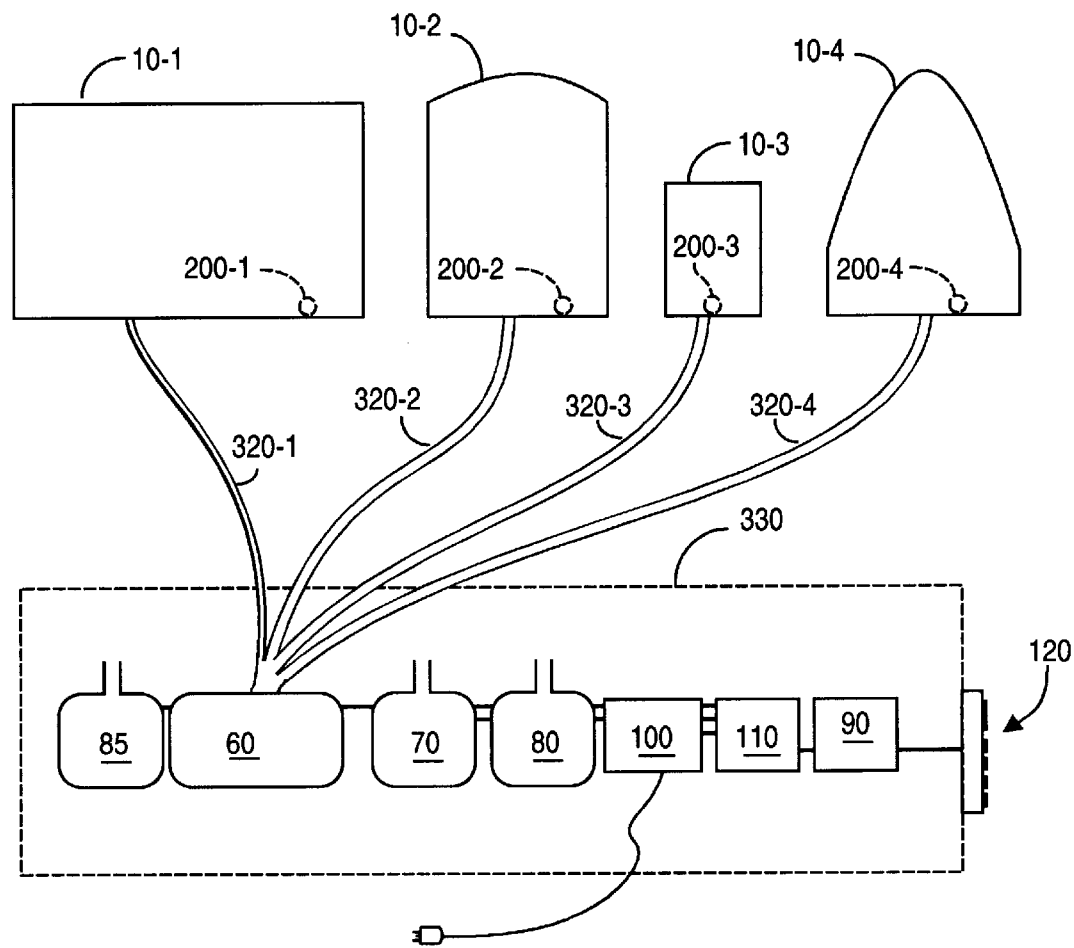
FIG. 5 depicts a system in which a central unit services a plurality of separate compartments, according to the present invention.

As shown in FIG. 5, it is possible to have multiple housing units 10-1, 10-2, . . . etc. each having one or more internal sensors 200-1, 200-2, . . . , coupled via cable and tube umbilicals 320-1. 320-2, . . . to a centralized unit 330 that contains the vacuum pump and other environmentally altering units, e.g., any or all of 60, 70, 80, 85, 90, 110, power source 100, and one or more control units 120. This configuration differs from the self-contained units shown in FIGS. 1, 2, 6A and 6B (see following).

As indicated by FIG. 5, there is no requirement that the various housings have similar shapes or sizes. In a commercial application such as a bakery, perhaps housing 30-1 will be large and store a great many baked good, whereas housing 30-3 may be smaller and will be visible to the consuming public, perhaps with a housing that includes a glass or plastic viewing window.

Figure 6A:
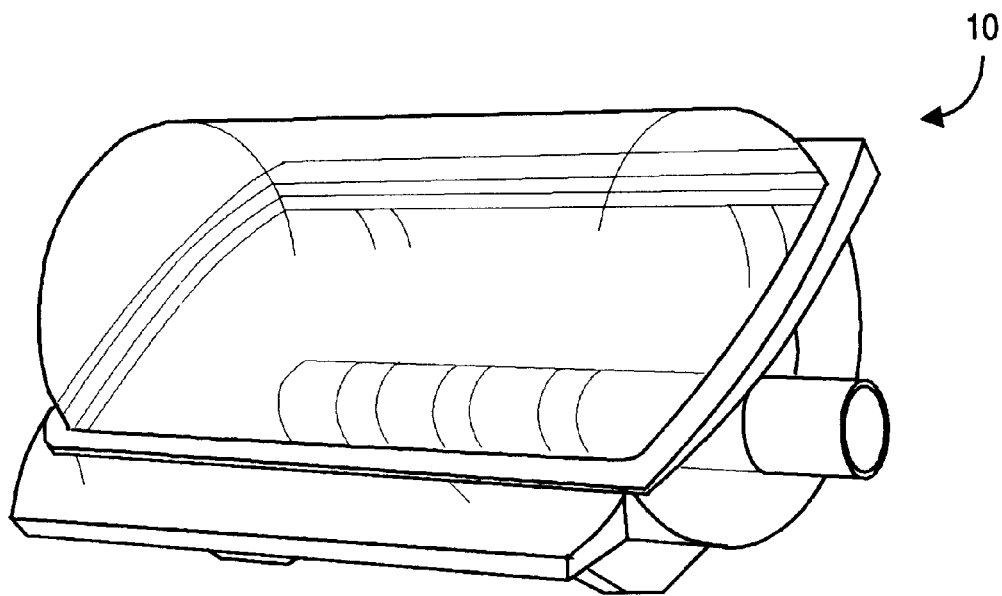
FIGS. 6A and 6B are perspective views of preferred embodiments of portable food conservators, according to the present invention.
Figure 6B:
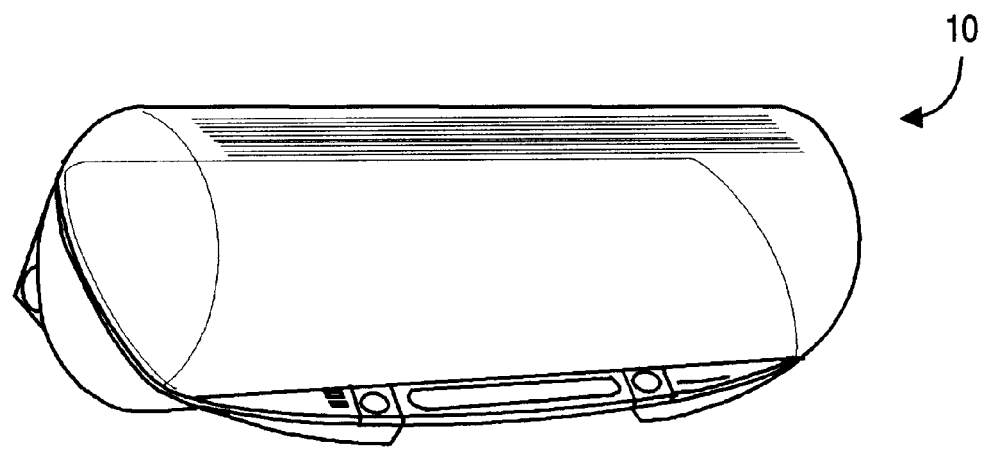

FIGS. 6A and 6B are artist's renditions of two embodiments of housings 10, according to the present invention. Understandably, housing 10 may be fabricated with a variety of shapes and sizes.

Modifications and variations may be made to the disclosed embodiments without departing from the subject and spirit of the invention as defined by the following claims.

What is claimed is:

1. A system for extending lifetime of foodstuffs, comprising:
    a container having a sealable compartment sized to hold said foodstuffs;
    means for creating a vacuum within said sealable compartment; and
    means for maintaining a desired humidity within said sealable compartment;
    wherein at least one of said means for creating and said means for maintaining is disposed within said container.

2. The system of claim 1, wherein said vacuum is about 10" Hg.

3. The system of claim 1, wherein said humidity is at least about 60% relative humidity.

4. The system of claim 1, further including microprocessor means for controlling a magnitude of said vacuum within said sealable compartment.

5. The system of claim 1, further including microprocessor means for controlling a magnitude of said humidity within said sealable compartment.

6. The system of claim 1, further including means for introducing ozone into said sealable compartment.

7. The system of claim 1, further including means for exposing said sealable compartment to activated charcoal.

8. The system of claim 1, further including means for cooling said sealable compartment.

9. The system of claim 1, further including a Peltier unit for cooling said sealable compartment.

10. The system of claim 1, further including feedback means for controlling at least one characteristic within said sealable compartment selected from a group consisting of (a) magnitude of said vacuum, and (b) magnitude of said humidity.

11. The system of claim 1, further including feedback means for controlling at least one characteristic within said sealable compartment selected from a group consisting of (a) magnitude of temperature, (b) amount of ozone, (c) amount of ultraviolet radiation to which said sealable compartment is exposed, (d) amount of ozone, and (e) amount of activated charcoal to which said sealable compartment is exposed.

12. The system of claim 10, further including a control unit, coupled to said feedback means, to permit a user to manually input data used by said feedback means to control at least one said characteristic.

13. The system of claim 11, further including a control unit, coupled to said feedback means, to permit a user to manually input data used by said feedback means to control at least one said characteristic.

14. The system of claim 1, wherein said foodstuffs include baked goods.

15. The system of claim 1, wherein said system is self-contained and sized to fit upon a household kitchen counter.

16. The system of claim 1, wherein at least one of said means for creating and said means for maintaining operates under control of a microprocessor.

17. The system of claim 1, further including a second said sealable container, separate from said sealable container, coupled to said means for creating and to said means for maintaining.

18. A system for extending lifetime of foodstuffs, comprising:
    at least one sealable compartment sized to hold said foodstuffs;
    at least one of feedback means for creating within said sealable compartment a controllable vacuum of about 10" Hg, and feedback means for maintaining within said sealable compartment at least about 60% relative humidity; and
    a control unit, coupled to said feedback means, that permits user setting at least one of vacuum and humidity within said sealable compartment.

19. The system of claim 18, wherein said feedback means includes a microprocessor coupled to at least two of (a) a vacuum generator coupled to said sealable compartment, (b) a relative humidity control unit coupled to said sealable compartment, (c) an ultraviolet generator coupled to said sealable compartment, (d) an ozone generator coupled to said sealable compartment, (e) a temperature unit coupled to said sealable compartment, and (f) a source of activated charcoal coupled to said sealable compartment.

20. A method for extending lifetime of foodstuffs, comprising the following steps:
    (a) placing said foodstuffs in a sealable compartment and sealing said sealable compartment;
    (b) creating within said sealable compartment at least one condition selected from a group consisting of (i) a controllable vacuum of about 10" Hg, and (ii) a humidity that is at least about 60% relative humidity; and
    (c) providing feedback to sense and control at least one of (i) magnitude of said vacuum, (ii) magnitude of said humidity, (iii) ozone content within said sealable compartment, (iv) ultraviolet radiation to which said sealable compartment is exposed, (v) temperature within said sealable compartment, and (vi) amount of activated charcoal to which said sealable compartment is exposed.

* * * * *